United States Patent
Hauser

(10) Patent No.: US 10,280,116 B2
(45) Date of Patent: May 7, 2019

(54) ADDITIVE MIXTURE FOR ADDITION TO A MIXTURE OF SURFACING MATERIALS AND THE COMPOSITE SURFACING SYSTEMS FORMED THEREFROM

(71) Applicant: Synfola GmbH, Bäch (CH)

(72) Inventor: Kaspar Hauser, Mollis (CH)

(73) Assignee: Synfola GmbH, Bäch (CH)

( * ) Notice: Subject to any disclaimer, the term of this patent is extended or adjusted under 35 U.S.C. 154(b) by 130 days.

(21) Appl. No.: 15/110,046

(22) PCT Filed: Nov. 28, 2014

(86) PCT No.: PCT/EP2014/075976
§ 371 (c)(1),
(2) Date: Jul. 6, 2016

(87) PCT Pub. No.: WO2015/104096
PCT Pub. Date: Jul. 16, 2015

(65) Prior Publication Data
US 2016/0332910 A1     Nov. 17, 2016

(30) Foreign Application Priority Data

Jan. 10, 2014 (CH) .......................... 25/14

(51) Int. Cl.
| | |
|---|---|
| C04B 14/20 | (2006.01) |
| C08K 3/34 | (2006.01) |
| C09D 7/61 | (2018.01) |
| C09D 7/80 | (2018.01) |
| C09D 163/00 | (2006.01) |
| C09D 175/04 | (2006.01) |
| C04B 26/12 | (2006.01) |
| C04B 26/14 | (2006.01) |
| C04B 26/16 | (2006.01) |
| C04B 26/18 | (2006.01) |
| C04B 28/02 | (2006.01) |
| C04B 28/04 | (2006.01) |
| C04B 28/06 | (2006.01) |
| C04B 28/16 | (2006.01) |
| C04B 40/00 | (2006.01) |
| C04B 111/28 | (2006.01) |
| C04B 111/60 | (2006.01) |

(52) U.S. Cl.
CPC .............. *C04B 14/20* (2013.01); *C04B 26/12* (2013.01); *C04B 26/14* (2013.01); *C04B 26/16* (2013.01); *C04B 26/18* (2013.01); *C04B 28/02* (2013.01); *C04B 28/04* (2013.01); *C04B 28/06* (2013.01); *C04B 28/16* (2013.01); *C04B 40/0039* (2013.01); *C04B 40/0042* (2013.01); *C04B 2111/28* (2013.01); *C04B 2111/60* (2013.01); *Y02P 40/146* (2015.11)

(58) Field of Classification Search
None
See application file for complete search history.

(56) References Cited

U.S. PATENT DOCUMENTS

| | | | | |
|---|---|---|---|---|
| 3,215,543 | A | * 11/1965 | Bre ........................... | C03C 3/17 264/110 |
| 3,793,269 | A | * 2/1974 | Bruschtein et al. ....... | C09J 1/00 523/220 |
| 6,478,867 | B1 | 11/2002 | Cheyrezy et al. | |
| 2011/0071256 | A1 | 3/2011 | Nowak et al. | |
| 2014/0216653 | A1* | 8/2014 | Wu ......................... | C04B 28/06 156/325 |

FOREIGN PATENT DOCUMENTS

| | | | | |
|---|---|---|---|---|
| AT | 230260 | B | 11/1963 | |
| DE | 69804134 | T2 | 10/2002 | |
| DE | 102008001808 | A1 | 11/2009 | |
| EP | 0879805 | A1 | 11/1998 | |
| KR | 20040038610 | A * | 5/2004 | ............. C04B 14/20 |
| KR | 20120032769 | A * | 4/2012 | ........... C09D 163/00 |
| SU | 381637 | A * | 8/1973 | ............. C04B 21/00 |

OTHER PUBLICATIONS

Machine translation of KR 20120032769 A (no date).*
Machine translation of KR 20040038610 A (no date).*
Machine translation of SU 381637 A (no date).*
"Sieve Conversion Chart" provided by www.gclabequipment.com (no date).*

* cited by examiner

*Primary Examiner* — Michael J Feely
(74) *Attorney, Agent, or Firm* — DWC Law Firm, P.S.; Ann W. Speckman; David Chen

(57) ABSTRACT

The invention relates to an additive mixture for addition to a building material covering mixture for forming a composite covering system for the floor, wall, or facade area, which additive mixture reduces the thermal conductivity or thermal dissipation of covering systems, in particular the thermal dissipation through objects and sub-bases coated with the covering system, in such a way that walking on the sub-base provided with the covering system is no longer associated with a sensation of cold feet. This is achieved in that the additive mixture has a proportion of between 50% wt and 95% wt of Muscovite mica.

18 Claims, 1 Drawing Sheet

ADDITIVE MIXTURE FOR ADDITION TO A MIXTURE OF SURFACING MATERIALS AND THE COMPOSITE SURFACING SYSTEMS FORMED THEREFROM

TECHNICAL FIELD

The present invention describes a mixture of additives for addition to a mixture of surfacing materials to form a composite surfacing system for the field of floors, walls or facades, a composite surfacing system for the field of floors, walls or facades formed from a flowable or spreadable mixture of surfacing materials as well as a method for producing a composite surfacing system for the field of floors, walls or facades comprising a mixture of surfacing materials and a mixture of additives.

STATE OF THE ART

Building materials for the construction industry such as concrete mixtures, coatings and paints are available commercially that contain an additive mixture comprising an amount of mica usually in the form of muscovite-mica.

Muscovite-mica has a general chemical composition of $KAl_2[(OH,F)_2|AlSi_3O_{10}]$, crystallized in monoclinic or trigonal crystal system, is a mineral from the mineral class of silicates and germinates and belongs to the phyllosilicates. Muscovite-mica is also referred to as alumina-mica, occurs very commonly and is obtained by mining from natural deposits.

It is known that by adding a small amount of muscovite-mica to paints or coatings, a special visual impression of the coating can be obtained. Since muscovite-mica is a flaky material with a surface having a glassy or mother-of-pearl luster and usually a grayish-white color, so those skilled in the art have for a long time been using the addition of small amounts to achieve decorative effects. Known mixtures used in the construction industry in the form of coatings include muscovite-mica in the form of particles with a particularly fine particle size in amounts of 0.5% by weight to max. 1% by weight. Even such small amounts of muscovite-mica lead to the creation of the desired decorative effects.

It is also known that by adding extremely small amounts of muscovite-mica to construction material mixtures, for example in the form of concrete, a type of reinforcement is achieved. The particles of muscovite-mica are insoluble in water, chemically inert and have a lamellar structure which is retained in the production and processing of construction material mixtures. Susceptibility to cracking of cast concrete components can thus be greatly reduced by adding small amounts of muscovite-mica because of its lamellar structure. Due to the properties muscovite-mica it is known that by adding small quantities of at most 1% by weight to construction material mixtures, less shrinkage can be achieved when the construction material mixture sets up so this reduces the risk of development of cracks.

A minimal addition of muscovite-mica, which is less than or equal to 1% by weight of the construction material mixture is described in the known prior art. This small amount of muscovite-mica leads to the desired mechanical properties and improves the setup behavior of construction material mixtures.

DESCRIPTION OF THE INVENTION

The object of the present invention is to reduce the thermal conductivity and/or dissipation of heat of coating systems for use in the field of floors, walls or facades. The dissipation of heat through objects and substrates coated with the coating system should be reduced by the fact that stepping on such a substrate provided with the coating system is no longer associated with the feeling of cold feet and therefore a greater foot heat is achieved.

By introducing an additive mixture into a casting composition of a known surfacing mixture and/or mixture of additives with a dry mix of a known surfacing material mixture, a composite surfacing system is formed on different surfaces and substrates. After drying and/or setup, the result is a composite surfacing system which greatly reduces the thermal conductivity by the object coated with this material mainly in the direction of the normal to the surface coated with the composite surfacing system. When a person touches or walks on the surface of the substrate having the composite surfacing system, the person has less tendency to develop cold hands or feet. This effect of a reduced dissipation of heat due to the composite coating system is not only subjectively perceptible but has also been measured objectively by means of heat dissipation measurements.

The object as formulated is achieved by the fact that an additive comprising a large amount of muscovite-mica is added to and/or dispersed into the construction mixture before the composite coating system sets up and is thus formed.

This object is preferably achieved by the fact that the additive contains muscovite-mica in an amount between 60% by weight and 95% by weight. A muscovite-mica content of at least 5% by weight to 50% by weight within the resulting composite surfacing system has led to the desired results which have a measurable influence on the dissipation of heat.

BRIEF DESCRIPTION OF THE DRAWINGS

The subject matter of the invention is described below, wherein the accompanying drawings are used to illustrate the measured thermal conduction properties and/or heat dissipation properties achieved by different composite surfacing systems.

DESCRIPTION

Figure 1:
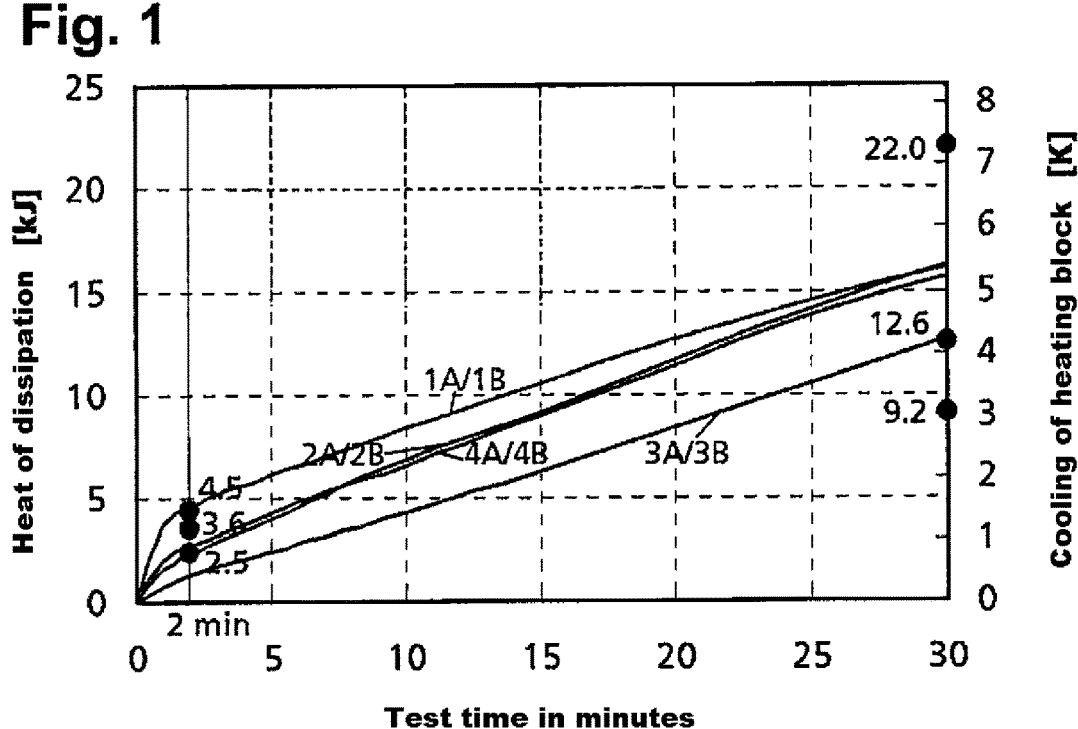
FIG. 1 shows a diagram of the cooling of a copper block during the dissipation of heat plotted as a function of time on four composite surfacing systems, measured with the measurement method and introduced by the EMPA Dübendorf according to the SIA 252 standard.

A mineral-based additive mixture is described below, forming a composite surfacing system when combined with a known commercially available surfacing material mixture.

This additive mixture is distributed under the brand name ISOPOWDER by the present applicant in various formulations. The respective formulation to be used and thus the composition of the additive mixture depend on the selected surfacing material mixture into which the additive mixture is to be incorporated and/or distributed.

The composite surfacing system is applied to various surfaces of objects and thus to various substrates, useful surfaces or industrial surfaces in the form of floors, walls, ceilings or facades. Whereas the pure surfacing material mixture has little or no thermal insulation properties, the thermal conduction properties of the resulting composite surfacing system are greatly altered by the addition of the additive mixture. The resulting thickness of the composite surfacing system is in the range of a few millimeters.

Surfacing material mixtures that can be used to form the desired composite surfacing systems on an existing suitably prepared surface fall under SAI 252, a registered standard of the Swiss Standards Association in the field of construction. These surfacing material mixtures may form composite surfacing systems in the form of seamless industrial floor coverings after the additive has been added. Mineral surfacings such as hard concrete surfacings, cement-synthetic resin surfacings, mortaring surfacings, xylolite surfacings, magnesia surfacings or anhydrite surfacings formed from water, gravel and an anhydrite finder may be used as the surfacing material mixtures.

As additional surfacing material mixtures, synthetic resin surfacings or surfacings containing plastics, which are usually applied to the substrate in thinner layers, may be used. The pure surfacing material mixture and/or the surfacing material mixture combined with the additive mixture is/are applied in at least one operation.

With our application in thin-layer systems, the amounts of additive mixture are between 7% by weight and 20% by weight of the amount of surfacing material mixture from mineral coatings and industrial polyurethane and epoxy resin systems the amount may even be 40% by weight to 50% by weight of the amount of the surfacing material mixture for a dispersed layer.

Dry Mix

First, before applying a dry mix in powdered or granular form comprising the surfacing material mixture and the additive mixture can be prepared by mixing. This dry mix can be blended to form a casting compound by combining it with mixing water and additives to form a casting compound, which is pourable or spreadable. This casting compound is then applied to the substrate in the desired layer thickness. After drying and/or setup, additional layers, for example at least one sealing layer may be applied.

Scattering in the Casting Compound

However if surfacing material mixtures in the form of plastic or synthetic resin surfacings, for example a polyurethane surfacing or an epoxy resin surfacing are used, then the additive mixture may also be dispersed into subsequently. After applying and spreading and/or spackling the surfacing material mixture, the desired amount of the additive mixture is dispersed into the surfacing material mixture, so that the additive mixture is combined with the surfacing material mixture only after application of the surfacing material mixture.

The casting compound, comprising the surfacing material mixture or surfacing material mixture and additive mixture can be applied easily and quickly in one layer seamlessly in one operation. The resulting composite surfacing system has a sufficiently high compressive strength and tensile load-bearing capacity and the dissipation of heat from the substrate, the heat dissipation is reduced to the desired extent by the addition of the additive mixture.

Definition of the Additive

The main component of the additive mixture is muscovite-mica, which is available in powdered or granular form in the amount of 50% by weight to 95% by weight in the additive mixture.

The muscovite-mica portion must be present in various grain sizes. It has been found that when using at least two quantities of different grain sizes, good heat dissipation values are established with the resulting composite surfacing system. Depending on the surfacing material mixture used, the muscovite-mica portion must consist of particles of a fine grain size, i.e., greater than 150 µm and less than 300 µm with a moderately fine grain size greater than 400 µm and less than 800 µm and/or a coarse grain size with particle sizes greater than or equal to 800 µm. Good results were achieved by using muscovite-mica MU in the form of MU85 (average particle size >160 µm), MU450 (>630 µm) and MU800 (>800 µm). The grain size is determined by determining the average particle diameter in scanning electron micrographs of a random sample of the respective muscovite-mica.

An additive mixture containing muscovite-mica in the form of one portion of a fine grain and one portion of a moderately fine grain size has been found to lead to good results.

Admixture of an additional portion of muscovite-mica with a coarse grain size has led to good results with the desired thermodynamic properties.

As experiments have shown, the desired thermodynamic properties of the resulting composite surfacing systems have been achieved with an additive mixture containing one portion of muscovite-mica with a coarse grain size and a moderately fine grain size and with an additive mixture with a portion of muscovite-mica with a coarse grain size and a fine grain size.

Due to the addition of the additive mixture comprising muscovite-mica in high concentrations, a composite surfacing system, which has a foot warmth similar to that of a xylolite surfacing can be achieved. Foot warmth here is understood to refer to a reduced thermal conductivity, so that one's feet do not get cold walking on the composite surfacing system.

Due to the different formulations of the additive mixture itself and/or the quantitative amount of the additive mixture in the surfacing material mixture, hard concrete floors, anhydrite, PU, epoxy resin surfacings and other surfacings having the desired foot warmth can now also be achieved.

At the same time the altered surfacing material mixtures due to the large amount of muscovite-mica must be adapted again with the following components in order to restore such properties as the flow, processability and binder content, separation, etc. Therefore it is important for each commercially available surfacing material mixture to be mixed with an adjusted formulation of the ISOPOWDER additive mixture and an adjusted quantity ratio to achieve the desired foot warmth and at the same time to also conform to the processing standards and installation standards for the entire composite surfacing system.

Optional Components

To obtain and/or restore the processing properties and the mechanical strength of the surfacing material mixture which is combined with the additive mixture, various additives are mixed into the additive mixture.

At least one flow optimizer, also known as a superplasticizer, a stabilizer to prevent separation, at least one binder, for example a portland cement, a filler and binder, for example calcium carbonate, a fire prevention component, a coating stabilizer and/or a white pigment is added as an additive to the additive mixture. Depending on the desired additive mixture which is coordinated with the surfacing material mixture, different concentrations of the additive will be selected, so that the result is different formulations of the additive mixture.

The flow optimizer used was Melflux® 2651 F, partially also in an overdose to ensure the flow of a coating or a flow mortar. In the case of hard concrete coatings, the uniform distribution of sand, cement, ISOPOWDER, etc. is thereby improved and processability is simplified.

Starvis 3003 F was added to the additive mixture as a stabilizer to control the separation if the water content becomes too high//when. This product was also overdosed in some cases because the main component, the muscovite-mica of the additive mixture, is highly absorbent and behaves like a water storage mechanism. However this property is also very effective because in the case of hard concrete surfacings in particular, a gradual release of moisture counteracts the development of cracks.

White portland cement (EN 197-1-CEM I 52.5 N (sw)) was used as the binder, especially in cement-based mineral coatings having a very high purity, so that the binder component missing due to the large amount of ISOPOWDER added is then itself added.

Use of portland cement CEM I 42.5 R was also tested as a binder and used for hard concrete surfacings and coating products that do not require a white cement content from the standpoint of quality. This also replaces the binder content omitted due to the large amount of ISOPOWDER added.

Minema 60/10, a calcium carbonate, was used as the filler and binder, which is used in the mineral coatings with which we are familiar or is compatible with other coatings and must be added as a supplement due to the large amount of ISOPOWDER added in order to compensate for the suction behavior (respiratory activity) as well as the degree of hardness. It also serves as a filler which is in some cases used in very small amounts, especially in mineral coatings.

APYRAL 24 which minimizes the flammability of the composite surfacing system was used as the fire prevention component in the experiments. APYRAL 24 restores the required compensation, so that the corresponding products such as STO Creative Mineral do not lose the fire class certification although the additive mixture is not flammable.

Quartz SIHELCO 35 which is a very pure and high-quality quartz, was used as the coating stabilizer which was selected because it is compatible and can be used in various mineral coatings and flow mortars. Thus at a dose of 5% to 20%, balance can be achieved with just one type of quartz in order to achieve the desired results in terms of processing, optics and strength of the composite surfacing system.

Titanium dioxide (Pretiox) was used as the white pigment.

Additive in Possible Concentrations

The mica-muscovite portion of the additive mixture was present in amounts between the minimal value A in weight percent and the maximum value B in weight percent of the total composition of the additive mixture in the experiments.

| A<br>% by<br>weight | B<br>% by<br>weight | Component |
| --- | --- | --- |
| 10 | 90 | MICA-MU 800 (mica coarse) |
| 30 | 90 | MICA-MU 450 (mica moderately fine) |
| 10 | 50 | MICA-MU 85 (mica fine) |

The additives used were used in amounts between A and B according to the following table relative to the total mass of the additive mixture, with which good results were achieved.

| A<br>% by<br>weight | B<br>% by<br>weight | Component |
| --- | --- | --- |
| 0.05 | 3 | Flow optimizer:<br>Melflux ® 2651 (superplasticizer) |
| 0.05 | 0.3 | Stabilizer against separation:<br>Starvis 3003 F |
| 6 | 30 | Binder:<br>White portland cement EN 197-1 - CEM I 52.5 N (sw) |
| 6 | 30 | Binder:<br>Portland cement (CEM I 42.5 R) |
| 4.00 | 15.00 | Fire prevention component:<br>APYRAL 24 |
| 5 | 20 | Coating stabilizer:<br>Quartz SIHELCO 35 |
| 0.5 | 4 | White pigment:<br>Pretiox titanium dioxide |
| 2 | 10 | Filler and binder:<br>Minema 60/10 calcium carbonate |

Formulation Example 1

To prepare the first composite surfacing system, a self-running spackling compound from BASF with the following composition was used as the surfacing material mixture:

| % by weight | Component |
| --- | --- |
| 18.5 | Ordinary portland cement (CEM I 42.5 R) |
| 11.5 | Calcium aluminate cement (40% Al$_2$O$_3$) |
| 6.5 | Calcium sulphate (synthetic anhydrite) |
| 41.35 | Quartz sand (0.1-0.3 mm) |
| 19.4 | Limestone powder (10-20 µm) |
| 2 | Redispersible latex powder |
| 0.2 | Citric acid various |
| 0.1 | Lithium carbonate (accelerator) |
| 0.2 | Melflux ® 2651 F (superplasticizer) |
| 0.1 | Starvis ® 3003 F (stabilizer) |
| 0.15 | Vinapor ® DF 9010 F (defoamer powder) |

This surfacing material mixture was combined with an additive mixture in the following composition:

| % by weight | Component |
| --- | --- |
| 0.26 | Melflux ® 2651 (superplasticizer) for optimizing flow |
| 0.14 | Starvis 3003 F stabilizer against separation |
| 16 | Portland cement (CEM I 42.5 R) |
| 48 | MICA-MU 450 (mica medium fine) |
| 35.6 | MICA-MU 85 (mica fine) |

The additive mixture here contains muscovite-mica in two different grain sizes.

This first composite system was prepared in two embodiments wherein 10% by weight (800 g surfacing material mixture, 80 g additive mixture 2', 193.6 g water) was used in a first test I) and in a second test II) 15% by weight (800 g surfacing material mixture, 120 g additive mixture, 202.4 g water) additive mixture was combined with the surfacing material mixture as a mineral surfacing (BASF mixture) and additional mixing water was added. The resulting flow properties, the optics and the thermal conduction properties of the composite surfacing system were as desired.

Formulation Example 2

An additive mixture with the following composition was added to a second mineral surfacing material mixture which is distributed under the brand name "Sto Creative Material":

| % by weight | Component |
|---|---|
| 0.16 | Melflux ® 2651 (superplasticizer) for optimizing flow |
| 0.14 | Starvis 3003 F stabilizer against separation |
| 12.00 | White portland cement EN 197-1 - CEM I 52.5 N (sw) Binder |
| 10.00 | MICA-MU 800 (mica coarse) |
| 45.00 | MICA-MU 450 (mica medium) |
| 18.00 | MICA-MU 85 (mica fine) |
| 2.00 | Pretiox titanium dioxide for better optics |
| 5.70 | APYRAL 24 to minimize flammability |
| 7.00 | Quartz SIHELCO 35 for stabilization of the coating |

The amount of muscovite-mica here has three different grain sizes.

A total of 3 kg of the additive was combined with 15 kg of the "Sto Creative Mineral" surfacing material mixture and mixed with additional mixing water. The amount of the additive mixture was therefore 20% of the weight of the surfacing material mixture so that the mixing ratio corresponded to one part additive mixture to five parts surfacing material mixture.

Formulation Example 3

An additive mixture according to the following composition was added to a surfacing material mixture in the form of an industrial hard concrete coating:

| % by weight | Component |
|---|---|
| 0.1 | Starvis 3003 F stabilizer against separation |
| 15.0 | Portland cement (CEM I 42.5 R) |
| 49.90 | MICA-MU 800 (mica coarse) |
| 20.0 | MICA-MU 450 (mica moderate) |
| 15.0 | MICA-MU 85 (mica fine) |

Here again the additive mixture is used in three different grain sizes.

Thermodynamically Tested Experimental Series

Various composite surfacing systems were applied to a square concrete block with a side length of 400 mm and a thickness of 120 mm. Before performing the heat dissipation measurements, the composite surfacing systems were fully hardened and dry. Two test bodies (P1, P2) were each provided with an identical composite surfacing system. Before performing the heat dissipation measurements, the test bodies were each stored for hours at a constant temperature of 20° C. The heat dissipation was determined on the two test bodies under identical conditions, each in two passes and an average value of the measured dissipation of heat by the two test bodies was determined. Since two test measurements were performed per test body, average values were obtained from four measurements 1AP1, 1AP2, 1BP1, 1BP2.

To measure the dissipation of heat and thus the thermal conduction perpendicularly through the test body with a composite surfacing system applied to the surface, a cylindrical copper block having a diameter of 120 mm and a contact surface of 113 cm$^2$ on the front end and preheated to 52° C. was used. The cylindrical copper block was thermally insulated along the circumferential surface and on the end surface facing away from the test body. In this way it was possible for thermal energy to be transferred and/or conducted from the copper block only through the end contact surface with which the copper block was placed on the composite surfacing system of the test body. The temperature loss was determined within 30 minutes after placing the copper block on the test body.

In order to minimize the error due to the release of heat by the copper block to the environment, a control measurement was also performed. In doing so the copper block was heated from 20° C. to 50° C., then placed on a 100-mm thick insulation plate made of polystyrene, and the temperature loss by the copper block within 30 minutes was measured. In this measurement the thermal energy cannot migrate through the end contact surface because the insulation plate is heated to 50° C. Therefore the heat loss here through the other walls is determined by determining the heat block temperature loss. The heat block loss measured at certain times was subtracted from the average value of the temperature measurements on cooling of the test bodies so that corrected temperature average values (corrected average) of the four measurements on each of the respective two test bodies were obtained as the result.

Test Bodies 1A/1B

The dissipation of heat by a first test body 1A and a second test body 1B comprising a composite surfacing system having a layer thickness of 40 mm on the surface of the test body was measured twice each. The composite surfacing system included a surfacing material mixture in the form of an industrial hard concrete surfacing (411 kg) and an additive mixture (30 kg) that was incorporated as well as additional additives. The quantitative amount of the additive mixture was approximately 7% of the mass of the surfacing material mixture in the form of the industrial hard concrete surfacing. The surfacing material mixture and the additive mixture that was incorporated were used in the form of a dry mix which was combined with mixing water and additives. The measured, averaged and corrected average values are listed in Table 1.

TABLE 1

| | Temperature loss | | | | | Heating | | Heat |
|---|---|---|---|---|---|---|---|---|
| min | 1A P1 [K] | 1A P2 [K] | 1B P1 [K] | 1B P2 [K] | Average [K] | block loss [K] | Average corrected [K] | dissipation [kJ] |
| 1 | 0.3 | 1.1 | 1.8 | 2.0 | 1.30 | 0.05 | 1.25 | 3.75 |
| 2 | 0.6 | 1.3 | 2.1 | 2.5 | 1.63 | 0.10 | 1.52 | 4.57 |
| 5 | 1.1 | 1.8 | 2.7 | 3.6 | 2.30 | 0.26 | 2.04 | 6.13 |
| 7 | 1.5 | 2.1 | 3.1 | 4.1 | 2.70 | 0.36 | 2.34 | 7.02 |
| 10 | 2.2 | 2.6 | 3.7 | 4.7 | 3.30 | 0.51 | 2.79 | 8.36 |
| 15 | 3.1 | 3.6 | 4.7 | 5.8 | 4.30 | 0.77 | 3.53 | 10.60 |
| 20 | 4.1 | 4.5 | 5.8 | 6.7 | 5.28 | 1.02 | 4.25 | 12.75 |
| 25 | 5.1 | 5.4 | 6.6 | 7.5 | 6.15 | 1.28 | 4.87 | 14.61 |
| 30 | 5.8 | 6.2 | 7.4 | 8.3 | 6.93 | 1.54 | 5.39 | 16.17 |

Test Bodies 2A/2B

The dissipation of heat by a first test body 2A and a second test body 2B, on which a surfacing material mixture in the form of an industrial epoxy resin coating with the additive mixture incorporated into it was arranged, with a total thickness of 3 mm, and the dissipation of heat was determined in another test series. The additive mixture was dispersed on the applied surfacing material mixture in the form of the industrial epoxy resin coating in a quality ratio of 1:1 in relation to the epoxy resin coating. Next, a seal was applied. The measured averaged and corrected average values are listed in Table 2.

TABLE 2

| min | Temperature loss | | | | | Heating | Heat |
| | 2A P1 [K] | 2A P2 [K] | 2B P1 [K] | 2B P2 [K] | Average [K] | block loss [K] | Average corrected [K] | dissi- pation [kJ] |
|---|---|---|---|---|---|---|---|---|
| 1 | 1.1 | 0.1 | 0.3 | 0.8 | 0.57 | 0.05 | 0.52 | 1.57 |
| 2 | 1.4 | 0.2 | 0.5 | 1.2 | 0.83 | 0.10 | 0.72 | 2.17 |
| 5 | 2.2 | 0.7 | 1.1 | 2.1 | 1.53 | 0.26 | 1.27 | 3.81 |
| 7 | 3.1 | 1.1 | 1.5 | 2.6 | 2.08 | 0.36 | 1.72 | 5.15 |
| 10 | 4.0 | 1.6 | 2.2 | 3.4 | 2.80 | 0.51 | 2.29 | 6.86 |
| 15 | 4.8 | 2.6 | 3.2 | 4.5 | 3.78 | 0.77 | 3.01 | 9.02 |
| 20 | 6.2 | 3.7 | 4.4 | 5.4 | 4.93 | 1.02 | 3.90 | 11.70 |
| 25 | 7.5 | 4.7 | 5.4 | 6.3 | 5.98 | 1.28 | 4.70 | 14.09 |
| 30 | 8.4 | 5.8 | 6.3 | 7.3 | 6.95 | 1.54 | 5.41 | 16.24 |

Test Bodies 3A/3B

Test bodies 3A and 3B were produced in accordance with the descriptions under test bodies 2A/2B with an epoxy resin coating in which the same amount of additive mixture was incorporated, but the seal was omitted. The measured averaged and corrected average values are listed in table 3.

TABLE 3

| min | Temperature loss | | | | | Heating | Heat |
| | 3A P1 [K] | 3A P2 [K] | 3B P1 [K] | 3B P2 [K] | Average [K] | block loss [K] | Average corrected [K] | dissi- pation [kJ] |
|---|---|---|---|---|---|---|---|---|
| 1 | 0.2 | 0.3 | 0.4 | 0.3 | 0.30 | 0.05 | 0.25 | 0.75 |
| 2 | 0.4 | 0.6 | 0.6 | 0.5 | 0.53 | 0.10 | 0.42 | 1.27 |
| 5 | 0.9 | 1.1 | 1.1 | 1.0 | 1.03 | 0.26 | 0.77 | 2.31 |
| 7 | 1.2 | 1.5 | 1.4 | 1.3 | 1.35 | 0.36 | 0.99 | 2.97 |
| 10 | 1.7 | 2.2 | 2.0 | 1.8 | 1.93 | 0.51 | 1.41 | 4.24 |
| 15 | 2.6 | 3.2 | 3.0 | 2.6 | 2.85 | 0.77 | 2.08 | 6.25 |
| 20 | 3.6 | 4.2 | 3.9 | 3.7 | 3.85 | 1.02 | 2.83 | 8.48 |
| 25 | 4.5 | 5.2 | 4.9 | 4.7 | 4.83 | 1.28 | 3.55 | 10.64 |
| 30 | 5.4 | 6.1 | 6.0 | 5.6 | 5.78 | 1.54 | 4.24 | 12.72 |

Test Bodies 4A/4B

The test bodies 4A and 4B are characterized by a composite surfacing system with an industrial PU coating as a coating material mixture which was provided with a dispersed additive mixture. The additive mixture and the PU coating were applied in a weight ratio of 1:1 and a 3-mm-thick composite surfacing system was created. Next this PU coating/additive mixture composition was also provided with a seal. The measured averaged and corrected average values are listed in table 4.

TABLE 4

| min | Temperature loss | | | | | Heating | Heat |
| | 4A P1 [K] | 4A P2 [K] | 4B P1 [K] | 4B P2 [K] | Average [K] | block loss [K] | Average corrected [K] | dissi- pation [kJ] |
|---|---|---|---|---|---|---|---|---|
| 1 | 0.3 | 0.4 | 1.3 | 0.9 | 0.72 | 0.05 | 0.67 | 2.02 |
| 2 | 0.6 | 0.6 | 1.6 | 1.2 | 1.00 | 0.10 | 0.90 | 2.69 |
| 5 | 1.0 | 1.3 | 2.3 | 2.1 | 1.68 | 0.26 | 1.42 | 4.26 |
| 7 | 1.3 | 1.8 | 2.7 | 2.6 | 2.10 | 0.36 | 1.74 | 5.22 |
| 10 | 2.1 | 2.3 | 3.2 | 3.2 | 2.70 | 0.51 | 2.19 | 6.56 |
| 15 | 3.0 | 3.5 | 4.3 | 4.3 | 3.78 | 0.77 | 3.01 | 9.02 |
| 20 | 4.2 | 4.4 | 5.3 | 5.4 | 4.83 | 1.02 | 3.80 | 11.40 |
| 25 | 5.3 | 5.6 | 6.2 | 6.5 | 5.90 | 1.28 | 4.62 | 13.86 |
| 30 | 6.3 | 6.4 | 7.1 | 7.3 | 6.78 | 1.54 | 5.24 | 15.72 |

By analysis of the heat dissipation values after 2 and 30 minutes, the test bodies and/or composite surfacing systems that were tested can be classified in accordance with the SIA 252:2002 standard for seamless industrial foreign systems. Composite surfacing systems, which have a heat loss of less than or equal to 3.6 kJ after two minutes and a heat loss of less than or equal to 12.6 kJ after 30 minutes are classified as surfacings that provide good thermal insulation. Composite surfacing systems which have a heat loss of less than or equal to 4.5 kJ after two minutes and a heat loss of less than or equal to 22.0 kJ after 30 minutes are classified as thermal insulation surfacings. The cornerstones of the classification are marked in FIG. 1 in cooling time by corresponding points after two minutes and after 30 minutes of cooling time.

The measurements on the test bodies 2A/2B, 3A/3B and 4A/4B are thus to be classified as composite surfacing systems that provide thermal insulation.

FIG. 2

Figure 2:
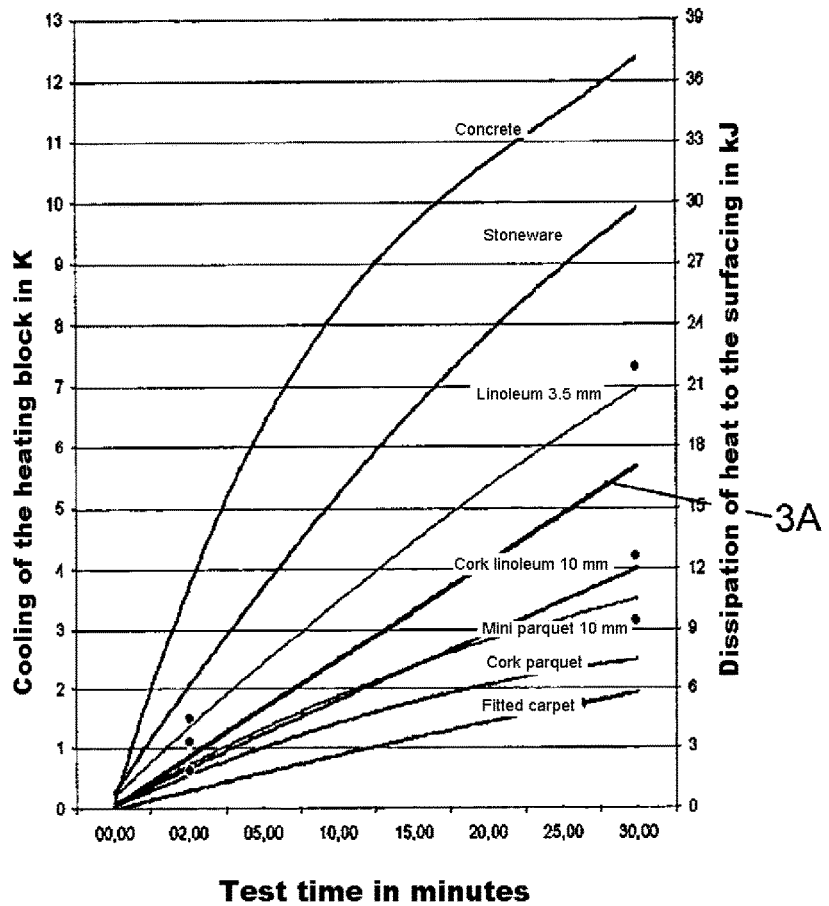
FIG. 2 shows the measured values recorded during cooling of a copper block with the dissipation of heat to a test body having a composite surfacing system comprising an industrial epoxy resin coating with an additive mixture dispersed in it during a measurement period of time of 30 minutes.

FIG. 2 shows as an example a measurement curve of the thermal dissipation measurement on test body 3A, wherein the measured raw data for cooling of the copper black and the heat dissipation calculated therefrom to the composite surfacing system had been plotted as a function of time. The comparative measurement of the heat dissipation by the copper block to the surroundings has not been taken into account here.

The composite surfacing system comprising an epoxy resin coating as the surfacing material mixture and an equal amount of an additive mixture in a suitable composition achieves a lower dissipation of heat than the comparative measurements on surfacing systems comprised of concrete, xylolite and linoleum in a thickness of 3.5 mm. FIG. 2 shows the classification values as points so that it is easy to see that the two lowest marks are achieved for primarily thermal insulation surfacing systems, namely equal to or less than 9.2 kJ after 30 minutes and equal to or less than 2.5 kJ after two minutes, which are achieved only by much thicker surfacing systems such as cork linoleum, mini parquet with a thickness of 10 mm and cork parquet as well as fitted carpet, wherein these insulation layers are not part of a surfacing system that can be applied seamlessly.

The invention claimed is:

1. An additive mixture for forming a composite surfacing system, the additive mixture comprising 50% by weight to 95% by weight of muscovite-mica, based on the overall weight of the additive mixture; wherein the muscovite-mica is in a powdered or a granular form and comprises: a first average particle size profile of larger than 150 μm and less than 300 μm and at least one different average particle size profile selected from the group consisting of a second average particle size profile of greater than 400 μm and less than 800 μm and a third average particle size profile of at least 800 μm; wherein the composite surfacing system is formed by adding the additive mixture to a surfacing material mixture; and wherein the composite surfacing system is for application to floors, walls or facades.

2. The additive mixture according to claim 1, wherein the muscovite-mica comprises the first average particle size profile and the second average particle size profile.

3. The additive mixture according to claim 2, wherein the muscovite-mica further comprises the third average particle size profile.

4. The additive mixture according to claim 1, 2 or 3, wherein the additive mixture further comprises one or more additives selected from the group consisting of flow optimizers, stabilizers to prevent separation, fire prevention components, coating stabilizers and white pigments.

5. The additive mixture according to claim 1, 2 or 3, wherein the additive mixture further comprises at least one additive in the form of a binder.

6. The additive mixture according to claim 5, wherein the binder comprises portland cement.

7. The additive mixture according to claim 1, 2 or 3, wherein the additive mixture further comprises a binder and/or a filler.

8. The additive mixture according to claim 7, wherein the binder and/or the filler comprises calcium carbonate.

9. The additive mixture according to claim 1, wherein the muscovite-mica comprises the first average particle size profile and the third average particle size profile.

10. The additive mixture of claim 1, wherein the third average particle size profile accounts for 10% to 90% by weight of the muscovite-mica.

11. The additive mixture of claim 1, wherein the second average particle size profile accounts for 30% to 90% by weight of the muscovite-mica.

12. The additive mixture of claim 1, wherein the first average particle size profile accounts for 10% to 50% by weight of the muscovite-mica.

13. A method for producing a composite surfacing system for application to floors, walls or facades, comprising:
   mixing a surfacing material mixture with the additive mixture according to claim 1; or
   applying and spreading and/or spackling a surfacing material mixture, and subsequently dispersing the additive mixture according to claim 1 into the surfacing material mixture;
wherein the resulting composite surfacing system comprises between 6% by weight and 50% by weight of the muscovite-mica of the additive mixture.

14. A composite surfacing system for application to floors, walls or facades, comprising: the additive mixture according to claim 1 and a surfacing material mixture, such that the composite surfacing system comprises between 6% by weight and 50% by weight of the muscovite-mica of the additive mixture.

15. The composite surfacing system according to claim 14, comprising between 6% by weight and 20% by weight of the muscovite-mica of the additive mixture; and a surfacing material mixture comprising a mineral surfacing material selected from the group consisting of hard concrete, cement-synthetic resin, mortar, xylolite, magnesia, and an anhydrite.

16. The composite surfacing system according to claim 15, comprising between 6% by weight and 10% by weight of the muscovite-mica of the additive mixture; and a surfacing material mixture comprising hard concrete.

17. The composite surfacing system according to claim 14, comprising between 12% by weight and 50% by weight of the muscovite-mica of the additive mixture; and a surfacing material mixture comprising a synthetic resin or plastics.

18. The composite surfacing system according to claim 17, comprising between 40% by weight and 50% by weight of the muscovite-mica of the additive mixture; and a surfacing material mixture comprising a polyurethane or an epoxy material.

* * * * *